US012678749B1

(12) United States Patent
Du

(10) Patent No.: US 12,678,749 B1
(45) Date of Patent: Jul. 14, 2026

(54) CARBON DIOXIDE DRIVEN WATER CARBONATING SYSTEM

(71) Applicant: Foothill Land, LLC, Newport Coast, CA (US)

(72) Inventor: Benjamin R. Du, Newport Coast, CA (US)

(73) Assignee: Foothill Land, LLC, Newport Coast, CA (US)

( * ) Notice: Subject to any disclaimer, the term of this patent is extended or adjusted under 35 U.S.C. 154(b) by 0 days.

(21) Appl. No.: 19/179,650

(22) Filed: Apr. 15, 2025

(51) Int. Cl.
| | |
|---|---|
| *B01F 25/31* | (2022.01) |
| *A23L 2/54* | (2006.01) |
| *B01F 23/231* | (2022.01) |
| *B01F 23/236* | (2022.01) |
| *B01F 23/237* | (2022.01) |
| *B01F 25/312* | (2022.01) |
| *B01F 35/71* | (2022.01) |
| *B01F 35/75* | (2022.01) |
| *B01F 101/14* | (2022.01) |

(52) U.S. Cl.
CPC .......... *B01F 25/31242* (2022.01); *A23L 2/54* (2013.01); *B01F 23/231* (2022.01); *B01F 23/2362* (2022.01); *B01F 23/2364* (2022.01); *B01F 23/237621* (2022.01); *B01F 25/3123* (2022.01); *B01F 35/717613* (2022.01); *B01F 35/7547* (2022.01); *B01F 2101/14* (2022.01)

(58) Field of Classification Search
CPC .............. B01F 25/31242; B01F 23/231; B01F 23/2362; B01F 23/2364; B01F 23/237621; B01F 25/3123; B01F 35/717613; B01F 35/7547; B01F 2101/14; A23L 2/54
See application file for complete search history.

(56) References Cited

U.S. PATENT DOCUMENTS

| | | | | |
|---|---|---|---|---|
| 3,552,726 | A | * | 1/1971 | Kraft ................... B01F 23/2362 261/50.1 |
| 3,756,576 | A | * | 9/1973 | Tremolada .......... B01F 23/2363 261/DIG. 7 |
| 4,540,349 | A | * | 9/1985 | Du .......................... F04B 9/135 417/393 |
| 4,889,662 | A | | 12/1989 | Smith |
| 4,927,567 | A | | 5/1990 | Rudick |
| 6,672,481 | B2 | | 1/2004 | Ziesel |
| 2002/0113087 | A1 | * | 8/2002 | Ziesel ................. B67D 1/0071 222/129.1 |
| 2008/0078769 | A1 | | 4/2008 | Crunkleton, III et al. |

* cited by examiner

*Primary Examiner* — Vishal Pancholi
(74) *Attorney, Agent, or Firm* — Stetina Garred Brucker & Newboles

(57) ABSTRACT

A motorless water carbonation system includes a CO2 driven double piston booster pump mounted over a pressurized chamber comprising CO2 and carbonated water. A supply of CO2 enters a lower part of chamber, and is partially absorbed in water and collects at the top of the chamber where it is used to drive the pump. The pump delivers high-pressure water into the top of the chamber, passing through a Venturi mixing nozzle which draws the CO2. The CO2 and water mixture is then injected on the surface of the water, creating turbulence to promote more mixing and carbonation.

20 Claims, 6 Drawing Sheets

CARBON DIOXIDE DRIVEN WATER CARBONATING SYSTEM

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to a water carbonating system, and more particularly, to pressurized water chamber where carbon dioxide (CO2) and water are mixed. The chamber is partially filled with carbonated water where CO2 is first injected and absorbed by the water to facilitate carbonation. The residual CO2 percolates to the top of the chamber and is used to drive a double piston booster pump configured to inject water at high pressure into the top of the mixing chamber. A pump outlet uses a mixing Venturi nozzle which draws CO2 from the top of the chamber as it delivers high velocity water to create more mixing and further enhance water carbonation.

2. Description of the Related Art

Carbonated water is a preferred beverage due to its crisp, refreshing sensation. The effervescence associated with the carbonation may create a unique mouthfeel that many find more appealing that still water, and thus, is a satisfying alternative to sugary sodas. This can make drinking water more enjoyable and encourage better hydration, especially for those who find plain water unappealing.

While carbonated beverages are readily available in packaged cans and bottles, there is a clear desire to enable a user to make a carbonated beverage at their home, or in a restaurant, to avoid the need to purchase canned or bottled beverages. To that end, various carbonating devices have been developed which and are configured to produce a carbonated beverage. One example of a carbonating device is made by SODASTREAM, which mixes carbon dioxide with water to generate a carbonated beverage. However, conventional SODASTREAM machines do not achieve high levels of carbonation, as they may not include a dedicated pressurizing pump, and thus, may rely solely on the pressure of a small CO2 cartridge, which may experience rapid pressure loss once placed into use. Thus, users who desire higher levels are carbonation may be unsatisfied by the carbonated water produced by SODASTREAM-type machines.

Other conventional carbonating machines employ an electric pump to generate pressure typically needed to achieve higher levels of carbonation. However, electrical components increase the cost and complexity of such devices, while also raising safety concerns.

Accordingly, there is a need in the art for a non-electric carbonating device capable of generating carbonated water having sufficiently elevated levels of carbonation. Various aspects of the present disclosure address this particular need, as will be discussed in more detail below.

BRIEF SUMMARY

Various aspects of the present disclosure relate to a carbonating system that is more efficient in how it uses carbon dioxide (CO2) relative to conventional carbonating systems. Pressurized CO2 is initially injected into a chamber of water to allow some of the CO2 to be absorbed into the water to carbonate the water. CO2 that is not absorbed into the water collects at the top of the reservoir body and is of sufficient pressure to drive a booster pump which boosts the pressure of water delivered to the pump. As such, the carbonating system may be a two-stage system in the sense that a first-stage entails absorption of CO2 directly injected into water, and a second stage entails use of the pressurized CO2 to drive the booster pump, which delivers water under pressure into the reservoir body to mix with the CO2.

In accordance with one embodiment of the present disclosure, there is provided a carbon dioxide (CO2) driven water carbonating device comprising a reservoir body having a chamber for receiving water. A CO2 delivery inlet is in fluid communication with the chamber and is fluidly connectable to a pressurized CO2 source. The CO2 delivery inlet is configured to deliver the pressurized CO2 into the chamber. A CO2 float valve is in fluid communication with the chamber to receive pressurized CO2 from the chamber. A pump control valve is in fluid communication with the CO2 float valve. The device additionally includes a first pumping chamber and a second pumping chamber, each being fluidly connectable to the pump control valve. A first piston head resides in the first pumping chamber and divides the first pumping chamber into a first CO2 zone and a first H2O zone. A second piston head resides in the second pumping chamber and divides the second pumping chamber into a second CO2 zone and a second H2O zone. A water inlet is in fluid communication with the first H2O zone, the second H2O zone, and is fluidly connectable to a pressurized water source. The device further includes a pressurized water outlet. The pump control valve is configured to be transitional between a first mode and a second mode. In the first mode, the pump control valve is configured to place the CO2 float valve in fluid communication with the first CO2 zone, the water inlet is in fluid communication with the second H2O zone and the first H2O zone is in fluid communication with the pressurized water outlet. In the second mode, the pump control valve is configured to place the CO2 float valve in fluid communication with the second CO2 zone, the water inlet is in fluid communication with the first H2O zone and the second H2O zone in fluid communication with the pressurized water outlet.

The device may additionally include an exhaust disposable in fluid communication with the second CO2 zone when the pump control valve is in the first mode and the first CO2 zone when the pump control valve is in the second mode.

The device may also include a shaft connecting the first piston head and the second piston head. The first piston head and the second piston head may be of equal diameters.

The device may further comprise a venturi valve body or a stone bubbler at the CO2 delivery inlet to facilitate mixing of CO2 and water in the chamber as pressurized CO2 flows through the venturi valve body or stone bubbler.

The device may also include a venturi valve body at the pressurized water outlet to facilitate mixing of pressurized water and CO2 in the chamber as pressurized water flows through the venturi valve body.

The CO2 float valve may include a float valve body configured to float on water in the chamber and transition between a closed position and an open position relative to the chamber, the float assuming the closed position when water level in the chamber exceeds a prescribed level to prevent $CO_2$ from the chamber flowing toward the pump.

The device may also include a dispensing valve in fluid communication with the chamber and configured to allow carbonated water to flow out of the chamber. A float valve body may be operatively associated with the dispensing valve, with the float valve body being configured to float on water in the chamber and transition between a closed position and an open position relative to the dispensing valve. The float valve body may assume the closed position when water level in the chamber falls below a prescribed level to restrict fluid from the chamber flowing through the dispensing valve.

Other embodiments are adapted for use with non-pressurized water sources. In such embodiments, there is provided a carbon dioxide ($CO_2$) driven water carbonating device comprising a reservoir body having a chamber for receiving water. A $CO_2$ delivery inlet is in fluid communication with the chamber and is fluidly connectable to a pressurized $CO_2$ source. The $CO_2$ delivery inlet is configured to deliver the pressurized $CO_2$ into the chamber. A $CO_2$ float valve is in fluid communication with the chamber to receive pressurized $CO_2$ from the chamber. A pump control valve is in fluid communication with the $CO_2$ float valve. The device additionally includes a $CO_2$ drive chamber and an $H_2O$ pumping chamber, each being fluidly connectable to the pump control valve. A $CO_2$ piston head resides in the $CO_2$ drive chamber and divides the $CO_2$ drive chamber into a first $CO_2$ zone and a second $CO_2$ zone. An $H_2O$ piston head resides in the $H_2O$ pumping chamber and divides the $H_2O$ pumping chamber into a first $H_2O$ zone and a second $H_2O$ zone. A water inlet is in fluid communication with the first $H_2O$ zone, the second $H_2O$ zone, and is fluidly connectable to a water source. The device further includes a pressurized water outlet. The pump control valve is transitional between a first mode and a second mode. In the first mode, the pump control valve is configured to place the $CO_2$ pump inlet in fluid communication with the first $CO_2$ zone, the water inlet in fluid communication with the first $H_2O$ zone, and the second $H_2O$ zone in fluid communication with the pressurized water outlet. In the second mode, the pump control valve is configured to place the $CO_2$ pump inlet in fluid communication with the second $CO_2$ zone, the water inlet in fluid communication with the second $H_2O$ zone, and the first $H_2O$ zone in fluid communication with the pressurized water outlet.

The first piston head may be of an area greater than that of the second piston head.

According to another embodiment, there is provided a method of carbonating water independent of an electronically driven pump. The method includes receiving pressurized carbon dioxide ($CO_2$) in a chamber of a reservoir body to allow the $CO_2$ to pass through water located within the chamber and pressurize the chamber. The method additionally includes reciprocating a pump control valve between a first mode and a second mode. In the first mode, the pump control valve is configured to facilitate movement of a piston assembly in a first pumping direction via introduction of pressurized $CO_2$ from the chamber in the reservoir body into a first pumping chamber and pressurized water into a second pumping chamber, with the piston assembly including a first piston head in the first pumping chamber and a second piston head in the second pumping chamber. In the second mode, the pump control valve is configured to facilitate movement of the piston assembly in a second pumping direction opposite the first pumping direction via introduction of pressurized $CO_2$ from the chamber in the reservoir body into the second pumping chamber and pressurized water into the first pumping chamber. Reciprocal movement of the pump control valve between the first and second modes causes pressurized water to be introduced into the chamber of the reservoir body to allow for mixing with the pressurize $CO_2$.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of a carbon dioxide driven carbonating pump and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Various aspects of the present disclosure are directed toward a carbon dioxide ($CO_2$) driven carbonating device configured to provide two-stage carbonation. In a first stage, pressurized $CO_2$ is delivered into a chamber to enable absorption of the $CO_2$ into the water. $CO_2$ that is not absorbed into the water may collect above the water under pressure and may be selectively introduced into a booster pump to boost the pressure of water delivered at the pump. The boosted water is then delivered to the chamber to mix with the $CO_2$ to facilitate the second stage of carbonation. As such, the carbonating device may be configured to operate independent of electricity, thereby making the device safer and less costly to operate than conventional, electrically operated carbonating devices.

Figure 1:
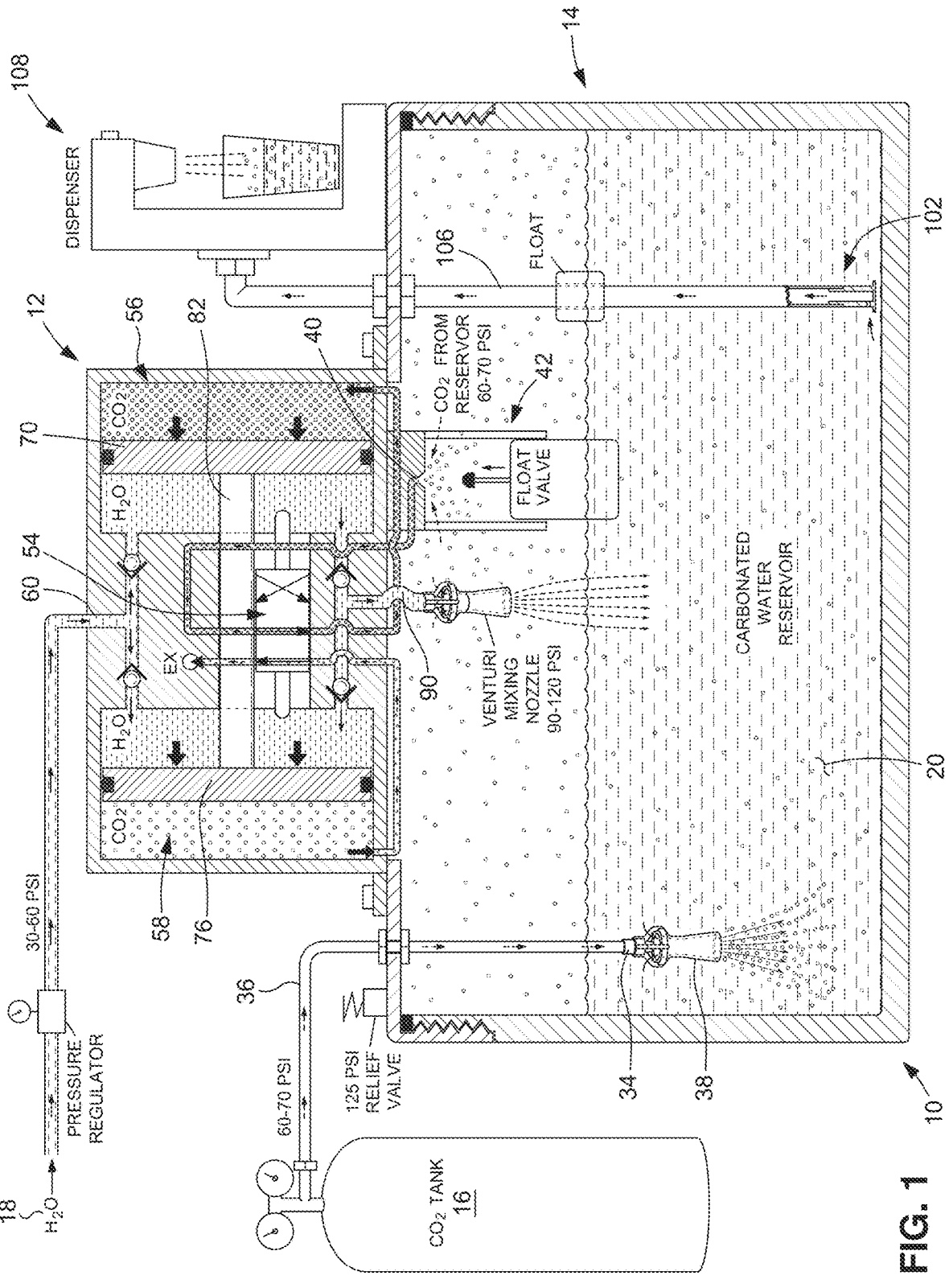
FIG. 1 is a schematic view of a first embodiment of a carbon dioxide ($CO_2$) driven water carbonating device for use with a pressurized water supply.

Referring now specifically to FIG. 1, there is depicted a schematic view of a water carbonating device 10 generally comprising booster pump 12 and reservoir body 14, with the pump 14 being configured to reside on top of the reservoir body 14. The device 10 is configured for use with a source of pressurized $CO_2$ 16 as well as a source of pressurized water 18, such as a residential water line. As will be explained in more detail below, the water carbonating device 10 utilizes the pressure of the $CO_2$ to boost the pressure of the incoming water to enhance the mixing of the $CO_2$ with the water to produce the desired carbonated water.

In more detail, the reservoir body 14 includes an internal chamber 20 for receiving water. The volume of the internal chamber 20 may vary from one embodiment to the next, and for example, may range from 50 ounces to 50 gallons. A smaller sized chamber may be intended for residential use, while a larger sized chamber may be intended for commercial use. The reservoir body 14 may be made of plastic, stainless steel, or other materials known in the art capable of retaining water for extended periods of time, and capable of holding $CO_2$ under pressure.

Figures 4, 4A, 5:
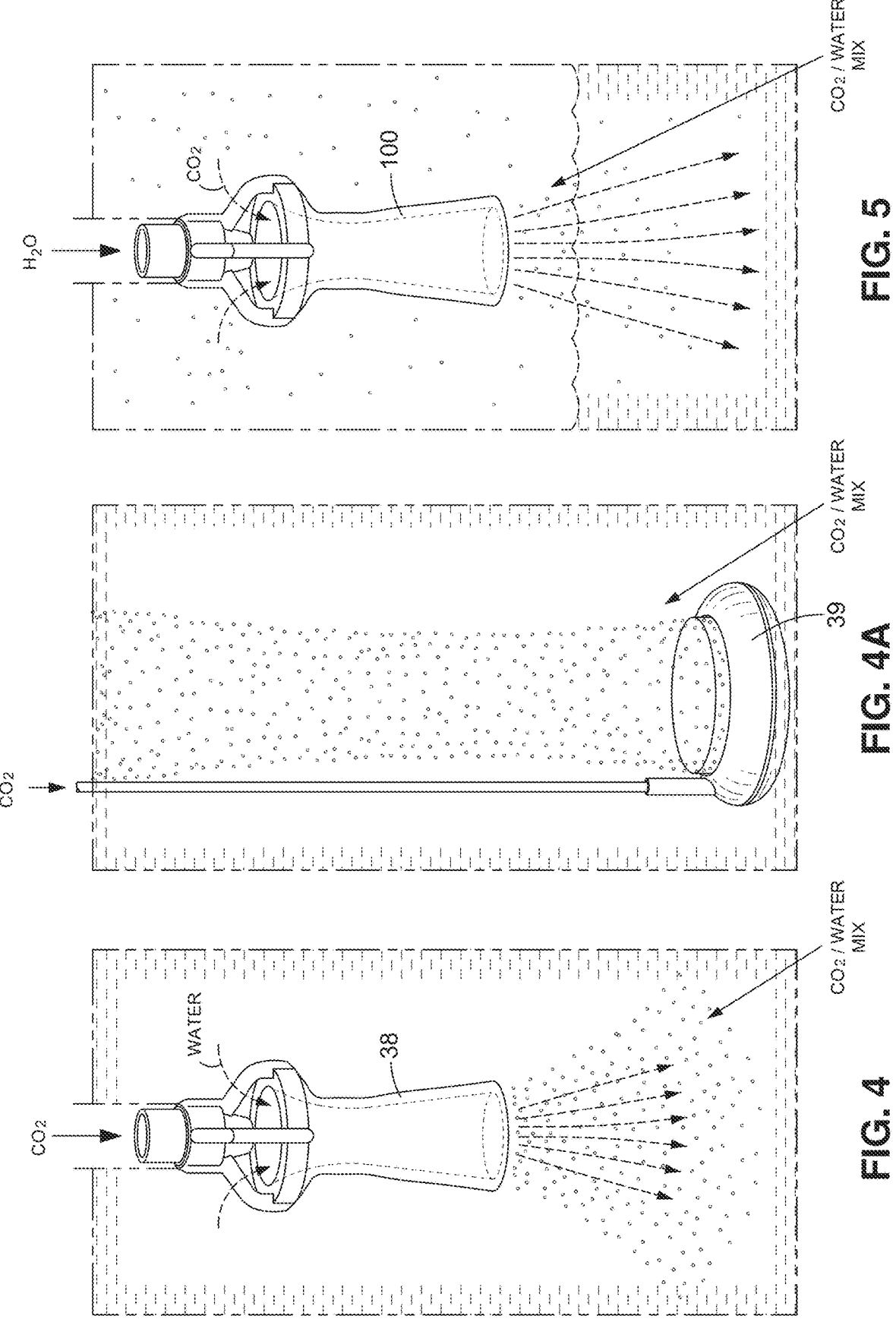
FIG. 4 is an upper perspective view of a $CO_2$ inlet venturi body to promote mixing of $CO_2$ passing through the valve with water, within which the $CO_2$ inlet venturi body is located.
FIG. 4A is an upper perspective view of a $CO_2$ inlet bubbler to promote mixing of the $CO_2$ with water.
FIG. 5 is an upper perspective view of the water inlet venturi body to promote mixing of water passing through the valve with $CO_2$, within which the water inlet venturi body is located.
Figure 7:
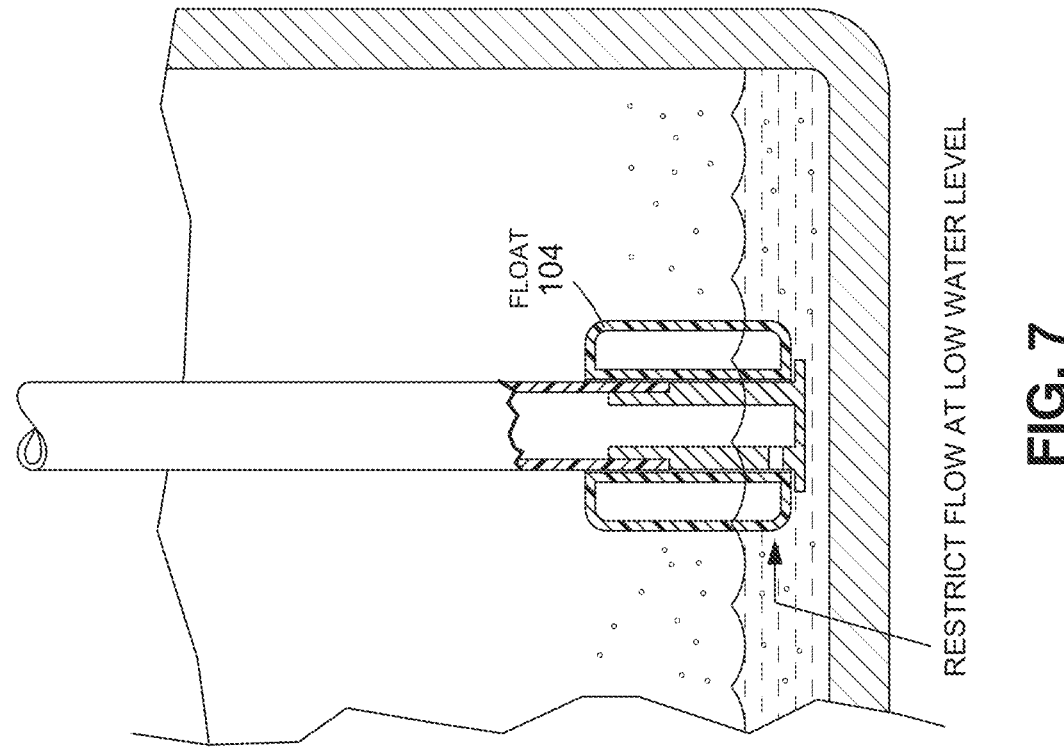
FIG. 7 is an enlarged view of the dispensing float control valve of FIG. 6 in a closed position relative to the dispending opening.
Figure 6:
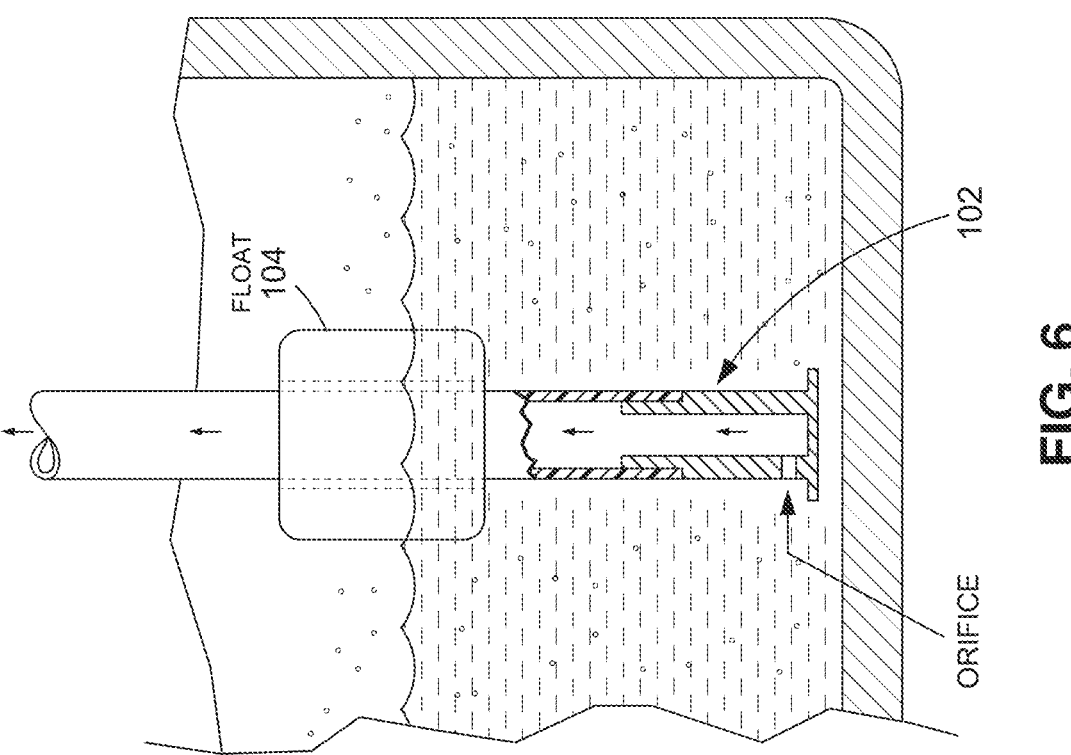
FIG. 6 is an enlarged view of a dispensing float control valve in an open position relative to a dispensing opening.

A $CO_2$ delivery inlet 34 is in fluid communication with the chamber 20 and fluidly connectable to the source of pressurized $CO_2$ 16. The $CO_2$ delivery inlet 34 is configured to receive the pressurized $CO_2$ from the $CO_2$ source 16 and deliver the pressurized $CO_2$ into the chamber 20 to facilitate a first stage of carbonation. It is contemplated that the pressurized $CO_2$ source 16 may include a $CO_2$ tank or cartridge that is connectable to the $CO_2$ delivery inlet 34 via a fluid line 36 extending between the pressurized $CO_2$ source 16 and the $CO_2$ delivery inlet 34. The pressurized $CO_2$ source 16 may supply $CO_2$ at a pressure between 60-70 PSI, although other pressures may be acceptable without departing from the spirit and scope of the present disclosure. In one embodiment, the $CO_2$ delivery inlet 34 is specifically configured and adapted to be submerged within the water in the reservoir body 14, such that $CO_2$ delivered into the chamber 20 via the $CO_2$ delivery inlet 34 enters into the water. Thus, the $CO_2$ delivery inlet 34 may be positioned below an intended waterline of the reservoir body 14. The submerged position of the $CO_2$ delivery inlet 34 may promote enhanced mixing of the $CO_2$ with the water to achieve desired carbonation levels of the water. The mixing may be enhanced through the use of a venturi valve body 38 at the $CO_2$ delivery inlet 34. In this regard, the pressure differential between the $CO_2$ passing through the venturi valve body 38 and the water in the chamber 20 may pull water through the venturi valve body 38 to mix with the $CO_2$, as can be seen in FIG. 4. FIG. 4A shows a bubbler 39, which may be an alternative to the venturi valve body 38. As $CO_2$ flows through the bubbler 39, which is submerged in the water, the $CO_2$ is aerated into bubbles to promotes mixing between the $CO_2$ and the water. Thus, both the venturi valve body 38 and the bubbler 39 are mixing valves to enhance mixing between the $CO_2$ and water to facilitate carbonation.

Figure 2:
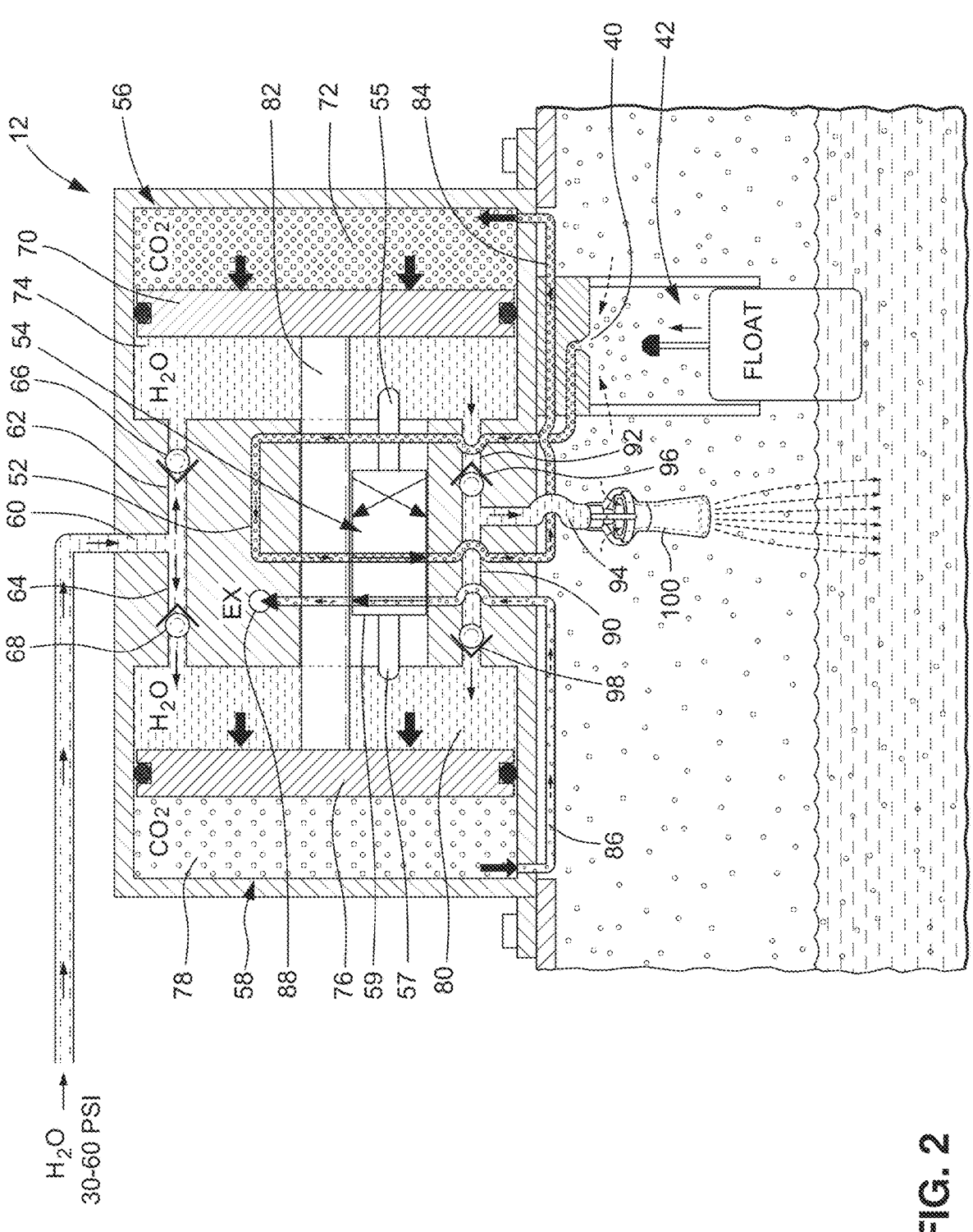
FIG. 2 is an enlarged schematic view of a pumping assembly and a $CO_2$ float valve of the device of FIG. 1, the $CO_2$ float valve being in an open position.
Figure 3:
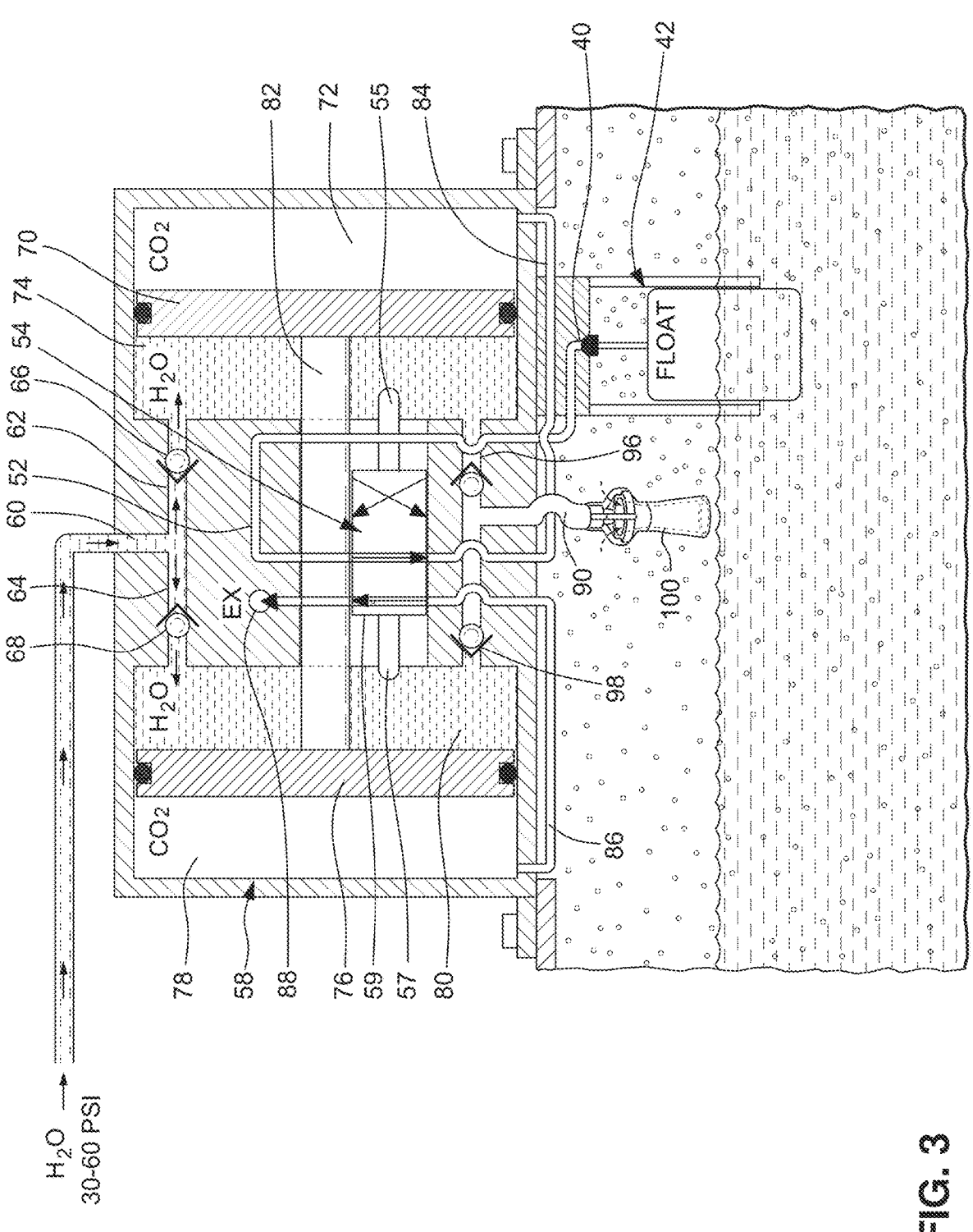
FIG. 3 is an enlarged schematic view of the pumping assembly and the $CO_2$ float valve being in a closed position.

The $CO_2$ dispensed through the $CO_2$ delivery inlet 34 mixes with the water to carbonate the water, and a portion of the $CO_2$ bubbles to the top of the water and collects above the water. The $CO_2$ collected at the top of the chamber 20 becomes pressurized and is used to drive the pump 12. $CO_2$ from the chamber 20 enters the pump 12 through a $CO_2$ pump inlet 40, and the flow through the $CO_2$ pump inlet 40 is controlled by a $CO_2$ float valve 42 in fluid communication with the chamber 20. $CO_2$ supplied to the pump 12 via the pump inlet 40 may be at 60-70 PSI. The $CO_2$ float valve 42 (e.g., a $CO_2$ pump inlet valve) is transitional between closed and open positions, with the flow of $CO_2$ from the chamber 20 to the pump 12 through the $CO_2$ pump inlet 40 being restricted/shut off when the $CO_2$ float valve 42 is in the closed position, and $CO_2$ being able to flow from the chamber 20 to the pump 12 through the $CO_2$ pump inlet 40 when the $CO_2$ float valve 42 is in the open position. FIGS. 1 and 2 show the $CO_2$ float valve 42 in the open position, with $CO_2$ flowing from the chamber 20 into the pump 12, while FIG. 3 shows the $CO_2$ float valve 42 in the closed position to block $CO_2$ from flowing from the chamber 20 into the pump 12.

FIG. 2 is an enlarged view of the pump 12, the $CO_2$ float valve 42 and the upper portion of the reservoir body 14 to more clearly depict those features. According to one embodiment, the $CO_2$ float valve 42 is configured to float on water in the chamber 20 and transition between the closed position and the open position based on the water level in the chamber 20. In particular, the float valve 42 assumes the closed position when water level in the chamber 20 exceeds a prescribed level to prevent $CO_2$ from the chamber 20 flowing into the pump 12, and assumes an open position when water level in the chamber is below the prescribed level to allow $CO_2$ from the chamber 20 to flow into pump 12.

The pump 12 includes an internal $CO_2$ delivery passageway 52 extending between the $CO_2$ pump inlet 40 and a pump control valve 54 to place the pump control valve 54 in fluid communication with the $CO_2$ pump inlet 40. The pump control valve 54 is configured to direct the flow of $CO_2$ and indirectly control the flow of water through the pump 12. In this regard, the pump control valve 54 is in communication with the $CO_2$ pump inlet 40. The pump control valve 54 includes a first actuating stem 55 and a second actuating stem 57 extending in opposite directions relative to a central body 59.

The pump 12 further includes a first pumping chamber 56 and a second pumping chamber 58, each being fluidly connectable to the pump control valve 54 and a water inlet 60. The water inlet 60 receives the pressurized water from the pressurized water source 18. In one embodiment, the magnitude of the pressure of the supplied water is 30-60 PSI. A pressure regulator may be used to regulate the pressure if the pressurized water source 18 supplies water at a pressure higher than desired. Other pressures may be acceptable without departing from the spirit and scope of the present disclosure. A first water inlet passageway 62 extends between the water inlet 60 and the first pumping chamber 56 and a second water inlet passageway 64 extends between the water inlet 60 and the second pumping chamber 58. Each of the first and second water inlet passageways 62, 64 includes a one-way valve 66, 68 to restrict fluid flow to flow only in a direction from the water inlet 60 to the respective first and second pumping chambers 56, 58. In this regard, the one-way valves 66, 68 may prevent water flow from the first and second pumping chambers 56, 58 toward the water inlet 60.

A first piston head 70 resides in the first pumping chamber 56 and divides the first pumping chamber 56 into a first CO2 zone 72 and a first H2O zone 74. A second piston head 76 resides in the second pumping chamber 58 and divides the second pumping chamber 58 into a second CO2 zone 78 and a second H2O zone 80. The first and second piston heads 70, 76 may be of equal diameters, that is, within an acceptable tolerance (e.g., less than or equal to a 5% difference). Each of the first and second piston heads 70, 76 may have a rubber gasket or seal connected thereto to fluidly isolate the corresponding H2O zones and CO2 zones within a given pumping chamber 56, 58. A shaft 82 may connect, and extend between, the first piston head 70 and the second piston head 76. A first internal CO2 passageway 84 may extend between the pump control valve 54 and the first pumping chamber 56, and a second internal CO2 passageway 86 may extend between the pump control valve 54 and the second pumping chamber 58.

The pump 12 may also include a CO2 exhaust 88 that may be used to selectively vent CO2 from the first and second pumping chambers 56, 58 during operation of the pump 12. The exhaust 88 may be in fluid communication with the pump control valve 54 to enable control of CO2 flow to the CO2 exhaust 88.

The pump 12 may further include a pressurized water outlet 90 configured to deliver boosted/pressurized water to the reservoir body chamber 20. A first water outlet passageway 92 extends between the water outlet 90 and the first pumping chamber 56 and a second water outlet passageway 94 extends between the water outlet and the second pumping chamber 58. Each of the first and second water outlet passageways 92, 94 includes a one-way valve 96, 98 to restrict fluid flow to flow only in a direction from the respective first and second pumping chambers 56, 58 to the water outlet 90. In this regard, the one-way valves 96, 98 may prevent water flow from the water outlet 90 to first and second pumping chambers 56, 58. The pressurized/boosted water may exit the pressurized water outlet 90 at a pressure of 90-120 PSI, which may be generated base on an input CO2 pressure of 60-70 PSI and an input water pressure of 30-60 PSI.

The pump control valve 54 is configured to be transitional between a first mode and a second mode when the CO2 float valve 42 is in the open position. Thus, CO2 is supplied to the pump control valve 54 via the CO2 delivery passageway 52 when the pump control valve 54 is in either the first mode or the second mode. The arrows depicted in FIGS. 1 and 2 show operation in the first mode. In particular, when in the first mode, the pump control valve 54 is configured to place the first CO2 zone 72 in fluid communication with the CO2 delivery passageway 52, such that the first CO2 zone 72 receives pressurized CO2 from the reservoir body chamber. Furthermore, the second H2O zone 80 is placed in fluid communication with the water inlet 60 to receive pressurized water from the water source 18. The first H2O zone 74 is placed in fluid communication with the pressurized water outlet 90 and the second CO2 zone 78 is placed in fluid communication with the exhaust 88. In this regard, from the perspective depicted in FIG. 1, the right side of the first piston head 70 is pressurized and the right side of the second piston head 76 is pressurized. The force acting on the first piston head 70 via the first CO2 zone 72 and the force acting on the second piston head 76 via the second H2O zone 80 may be cumulative due to their interconnection via the shaft 82. Thus, both the first and second piston heads 70, 76 are urged in a leftward direction, to compress the first H2O zone 74 and the second CO2 zone 78. Given the fluid connection between the second CO2 zone 78 and the exhaust 88, there may be minimal fluid resistance by the CO2 in the second CO2 zone 78 to the leftward movement of the first and second piston heads 70, 76. Accordingly, the collective force driving the first and second piston heads 70, 76 may be used to pressurize the water in the first H2O zone 74 and urge the water to exit the first H2O zone 74 and through the water outlet 90. The piston heads 70, 76 may continue in the leftward direction until the first piston head 70 contacts a first actuating stem 55 of the pump control valve 54 and urges the pump control valve 54 from the first mode toward the second mode. In this regard, as the pump control valve 54 transitions from the first mode toward the second mode, the central body 59 of the pump control valve 54 may move relative to the pump housing in a leftward direction from the perspective depicted in FIG. 2.

When in the second mode, the pump control valve 54 is configured to place the second CO2 zone 78 in fluid communication with the CO2 delivery passageway 52, such that the second CO2 zone 78 receives pressurized CO2 from the reservoir body chamber 20. Furthermore, the first H2O zone 74 is placed in fluid communication with the water inlet 60 to receive pressurized water from the water source 18. The second H2O zone 80 is placed in fluid communication with the pressurized water outlet 90 and the first CO2 zone 72 is placed in fluid communication with the exhaust 88. In this regard, from the perspective depicted in FIGS. 1 and 2, the left side of the first piston head 70 is pressurized and the left side of the second piston head 76 is pressurized. The force acting on the first piston head 70 via the first H2O zone 74 and the force acting on the second piston head 76 via the second CO2 zone 78 may be cumulative due to their interconnection via the shaft 82. Thus, both the first and second piston heads 70, 76 are urged in a rightward direction, to compress the second H2O zone 80 and the first CO2 zone 72. Given the fluid connection between the first CO2 zone 72 and the exhaust 88, there may be minimal fluid resistance by the CO2 in the first CO2 zone 72 to the rightward movement of the first and second piston heads 70, 76. Accordingly, the collective force driving the first and second piston heads 70, 76 may be used to pressurize the water in the second H2O zone 80 and urge the water to exit the second H2O zone 80 and through the water outlet 90. The piston heads 70, 76 may continue in the rightward direction until the second piston head 76 contacts the second actuating stem 57 of the pump control valve 54 and urges the pump control valve 54 from the second mode toward the first mode. In this regard, as the pump control valve 54 transitions from the second mode toward the first mode, the central body 59 of the pump control valve 54 may move relative to the pump housing in a rightward direction from the perspective depicted in FIG. 2.

The pump control valve 54 may be configured to continuously reciprocate between the first and second modes to continuously dispense pressurized water into the chamber 20 while the CO2 float valve 42 is in the open position. The pressurized water outlet 90 may be operatively associated with a venturi valve body 100 configured to promote mixing between the pressurized water dispensed through the pressurized water outlet 90 and the CO2 located in the chamber 20 to produce the carbonated water, as can be seen in FIG. 5.

The produced carbonated water may reside within the chamber 20 until a user wants to dispense the carbonated water to a cup or other receptacle. To that end, the device 10 may also include a dispensing valve 102 in fluid communication with the chamber 12 and configured to allow carbonated water to flow out of the chamber 20. The dispensing valve 102 may be in fluid communication with a dispensing tube 106 that extends out of the chamber 20 and into a dispensing unit 108. In one embodiment, a float valve body 104 may be operatively associated with the dispensing valve 102, with the float valve body 104 being configured to float on water in the chamber 20 and transition between a closed position and an open position relative to the dispensing valve 102. The float valve body 104 may assume the closed position when water level in the chamber falls below a prescribed level to restrict fluid from the chamber 20 flowing through the dispensing valve 102.

Figure 8:
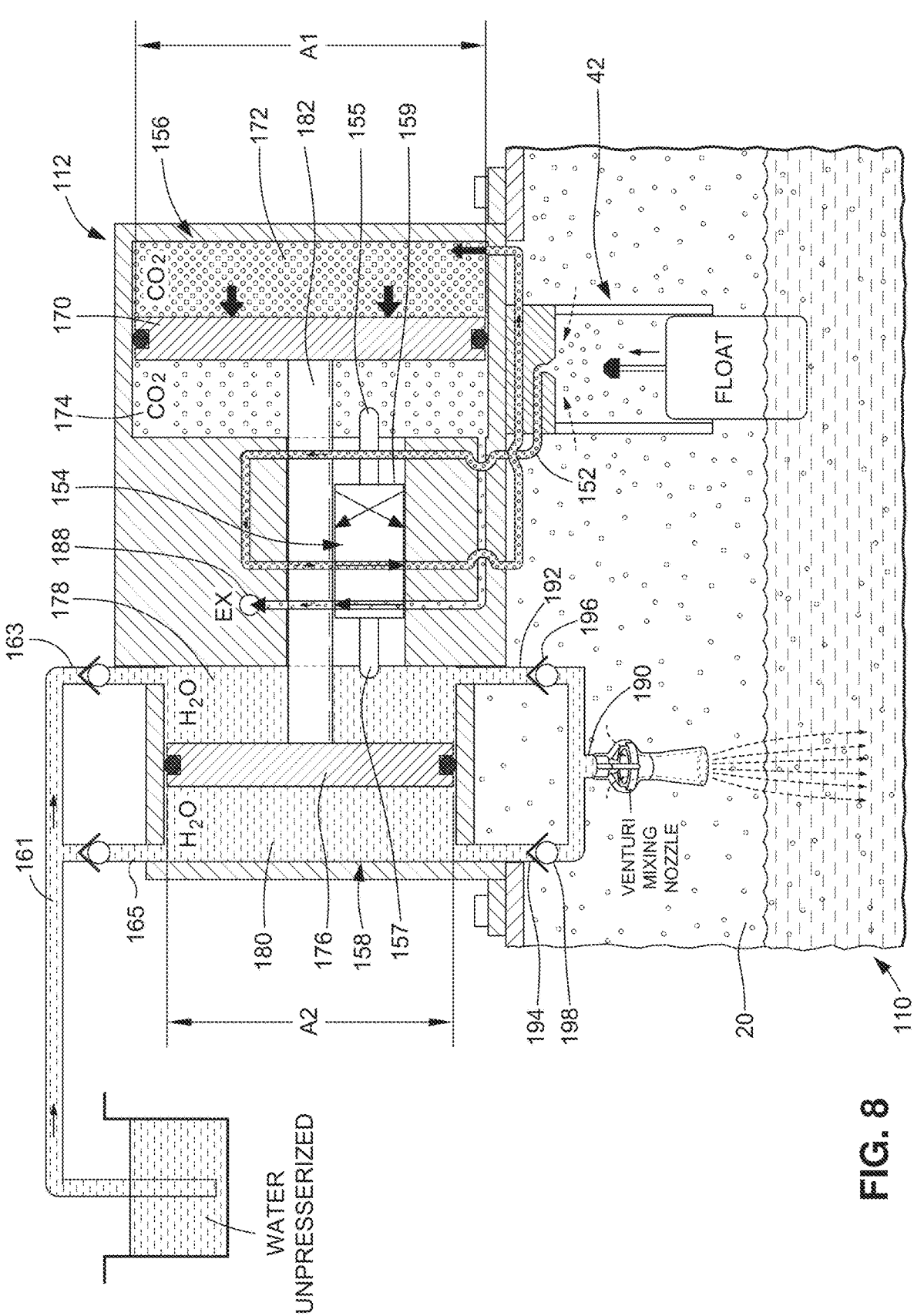
FIG. 8 is a schematic view of a second embodiment of a $CO_2$ driven water carbonating device for use with an unpressurized water supply.

While FIGS. 1-3 specifically relate to a device 10 adapted for use with a source of pressurized water, FIG. 8 relates to an alternative embodiment adapted for use with a source of non-pressurized water. While the embodiments may share several similarities, including the use and introduction of pressurized CO2, as well as delivery of carbonated water to the user, the following discussion with focus on differences in the device.

In particular, device 110 includes a pump 112 having a pump control valve 154, a CO2 drive chamber 156, and a H2O pumping chamber 158. The pump control valve 154 includes a first actuating stem 155, a second actuating stem 157 and a central body 159. A CO2 piston head 170 resides in the CO2 drive chamber 156 and divides the CO2 drive chamber 156 into a first CO2 zone 172 and a second CO2 zone 174. The CO2 piston head 170 is sized to define a first area A1. The pump 112 may include a first CO2 supply line extending from the pump control valve 154 to the first CO2 zone 172 and a second CO2 supply line extending from the pump control valve 154 to the second CO2 zone 174. A H2O piston head 176 resides in the H2O pumping chamber 158 and divides the H2O pumping chamber 158 into a first H2O zone 178 and a second H2O zone 180. The H2O piston head 176 is sized to define a second area A2, which is less than A1 for reasons which will be described in more detail below. A main water supply line 161 may extend from the unpressurized water source and may include a first branch 163 extending to the first H2O zone 178 and a second branch 165 extending to the second H2O zone 180. One-way valves 167, 169 may be located in the first and second branches 163, 165 to allow water flow from the unpressurized water source to the first and second H2O zones 178, 180, and prevent water flow from the first and second H2O zones 178, 180 to the unpressurized water source. A shaft 182 may connect, and extend between, the CO2 piston head 170 and the H2O piston head 176.

The pump 112 is configured to create high water pressure, even when there is no pressure in the water source. The high water pressure is created due to the first area A1 of the CO2 piston head 170 associated with the CO2 chamber being larger than the second area A2 of the H2O piston head 176. According to Pascal's law, if you have larger piston driving a smaller piston, a larger force on smaller area associated with the smaller piston creates greater pressure. The first area A1 may be anywhere from 10%-50% larger than the second area A2.

The pump 12 may also include a CO2 exhaust 188 that may be used to selectively vent CO2 from the first and second CO2 zones 172, 174 during operation of the pump 12. In this regard, separate exhaust lines may extend between the first and second CO2 zones 172 and the exhaust 188. The exhaust 188 may be in fluid communication with the pump control valve 154 to enable control of CO2 flow to the CO2 exhaust 188.

The pump 12 may further include a pressurized water outlet 190 configured to deliver boosted/pressurized water to the reservoir body chamber 20. A first water outlet passageway 192 extends between the water outlet 190 and the first H2O zone 178 and a second water outlet passageway 194 extends between the water outlet 190 and the second H2O zone 180. Each of the first and second water outlet passageways 192, 194 includes a one-way valve 196, 198 to restrict fluid flow to flow only in a direction from the respective first and second H2O zones 178, 180 to the water outlet 190. In this regard, the one-way valves 196, 198 may prevent water flow from the water outlet 190 to first and second H2O zones 178, 180.

The pump control valve 154 is configured to be transitional between a first mode and a second mode when the CO2 float valve 42 is in the open position. Thus, CO2 is supplied to the pump control valve 154 via a CO2 delivery passageway 152 when the pump control valve 154 is in either the first mode or the second mode. The arrows depicted in FIG. 8 show operation in the first mode. In particular, when in the first mode, the pump control valve 154 is configured to place the first CO2 zone 172 in fluid communication with the CO2 delivery passageway 152, such that the first CO2 zone 172 receives pressurized CO2 from the reservoir body chamber 20. This action creates a pressure differential between the first CO2 zone 172 and the second CO2 zone 174, thus urging the CO2 piston head 170 toward the second CO2 zone 174. This action causes a pressure differential between the first H2O zone 178 and the second H2O zone 180, namely, with the pressure being greater in the second H2O zone 180 than the first H2O zone 178 by virtue of the movement of the second piston head 176 toward the second H2O zone 180. As such, the unpressurized water is filled in the first H2O zone 178, while the water in the second H2O zone 180 is urged toward the outlet 190 under pressure. The second CO2 zone 174 is placed in communication with the exhaust 188 to allow CO2 from the second CO2 zone 174 to be vented through the exhaust 188.

When in the second mode, the pump control valve 154 is configured to place the second CO2 zone 174 in fluid communication with the CO2 delivery passageway 152, such that the second CO2 zone 174 receives pressurized CO2 from the reservoir body chamber 20. This action creates a pressure differential between the second CO2 zone 174 and the first CO2 zone 172, thus urging the CO2 piston head 170 toward the first CO2 zone 172. This action causes a pressure differential between the second H2O zone 180 and the first H2O zone 178, namely, with the pressure being greater in the first H2O zone 178 than the second H2O zone 180 by virtue of the movement of the second piston head 176 toward the first H2O zone 178. As such, the unpressurized water is filled in the second H2O zone 180, while the water in the first H2O zone 178 is urged toward the outlet 190 under pressure. The first CO2 zone 172 is placed in communication with the exhaust 188 to allow CO2 from the first CO2 zone 172 to be vented through the exhaust 188.

The devices 10, 110 described above allows for pressurized water to be supplied to the reservoir body, with the pressure of the water being elevated by the pump 112, driven by the pressurized CO2. Accordingly, the device 110 may provide a suitable alternative to electric carbonating devices, while also providing elevated levels of carbonation which exceed those of SODASTREAM-type conventional carbonators.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A two-stage carbon dioxide (CO2) driven water carbonating method comprising the steps of:

introducing CO2 into water located in a reservoir body, a first portion of the CO2 being absorbed into the water to carbonate the water in a first carbonating stage, and a second portion of the CO2 collecting in the reservoir body above the water;

using the second portion of the CO2 to drive a boosting pump to boost pressure of the water during operation of the boosting pump; and introducing the water from the boosting pump into the reservoir body to mix with CO2 in the reservoir body to facilitate a second carbonating stage.

2. The method recited in claim 1, wherein the step of introducing the water includes injecting the water into the reservoir body through a Venturi mixing valve.

3. The method recited in claim 1, wherein the step of introducing CO2 into the water includes introducing the CO2 via a mixing valve.

4. The method recited in claim 1, further comprising the step of facilitating dispensing of carbonated water from the reservoir body.

5. The method recited in claim 1, wherein all steps are performed independent of electricity being supplied to the boosting pump.

6. The method recited in claim 1, further comprising the step of receiving water at the boosting pump.

7. The method recited in claim 1, wherein the step of receiving water at the boosting pump includes receiving pressurized water at the boosting pump.

8. A two-stage carbon dioxide (CO2) driven water carbonating method comprising the steps of:

facilitating a first carbonating stage by allowing CO2 to absorb into water located in a reservoir body;

receiving pressurized CO2 from the reservoir body at a boosting pump configured to boost pressure of water flowing through the pump using the pressurized CO2; and facilitating a second carbonating stage by directing water from the boosting pump into the reservoir body to enable mixing with CO2 in the reservoir body.

9. The method recited in claim 8, wherein the step of facilitating a first carbonating stage includes introducing CO2 into the water.

10. The method recited in claim 9, wherein the step of introducing CO2 into the water includes introducing the CO2 via a mixing valve.

11. The method recited in claim 10, wherein the mixing valve is a stone bubbler.

12. The method recited in claim 8, wherein the step of facilitating a second carbonating stage includes injecting the water into the reservoir body through a Venturi mixing valve.

13. The method recited in claim 8, wherein the water received at the boosting pump is pressurized.

14. The method recited in claim 8, further comprising the step of facilitating dispensing of carbonated water from the reservoir body.

15. A carbonating method adapted to enable carbonation of water through the use of the pump configured to operate solely based on fluid pressure and without requiring electricity, the method comprising the steps of:

directing pressurized carbon dioxide (CO2) into water located in a reservoir to induce mixing of the pressurized CO2 and the water as part of a first carbonating stage;

allowing a portion of the pressurized CO2 to gather above the water in the reservoir;

using the gathered pressurized CO2 to drive a boosting pump;

receiving water at the boosting pump;

increasing the pressure of the received water by driving the boosting pump; and discharging the water from the boosting pump into the reservoir to mix with CO2 as part of a second carbonating stage.

16. The method recited in claim 15, wherein the step of directing pressurized CO2 into the water includes introducing the CO2 via a mixing valve.

17. The method recited in claim 16, wherein the step of introducing CO2 via a mixing valve includes introducing CO2 through a Venturi mixing valve.

18. The method recited in claim 16, wherein the step of introducing CO2 via a mixing valve includes introducing CO2 through a stone bubbler.

19. The method recited in claim 15, wherein the water received at the boosting pump is pressurized.

20. The method recited in claim 15, further comprising the step of facilitating dispensing of carbonated water from the reservoir.

* * * * *